United States Patent
Kim et al.

(10) Patent No.: US 8,538,583 B2
(45) Date of Patent: Sep. 17, 2013

(54) ROBOT AND CONTROL METHOD

(75) Inventors: Ji Young Kim, Seoul (KR); Kyung Shik Roh, Seongnam-si (KR); Jong Do Choi, Suwon-si (KR); Kwang Kyu Lee, Yongin-si (KR); Kyung Won Moon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 380 days.

(21) Appl. No.: 12/985,623

(22) Filed: Jan. 6, 2011

(65) Prior Publication Data

US 2011/0166709 A1 Jul. 7, 2011

(30) Foreign Application Priority Data

Jan. 6, 2010 (KR) ........................ 10-2010-0000938

(51) Int. Cl.
*B25J 13/02* (2006.01)
*B25J 13/08* (2006.01)

(52) U.S. Cl.
USPC .......................................................... 700/260

(58) Field of Classification Search
USPC .......................................................... 700/260
See application file for complete search history.

(56) References Cited

U.S. PATENT DOCUMENTS

2004/0140787 A1* 7/2004 Okamoto et al. ......... 318/568.21
2007/0152619 A1* 7/2007 Sugiyama et al. ....... 318/568.12

OTHER PUBLICATIONS

Aaron Edsinger and Charles C. Kemp, "Human-Robot Interaction for Cooperative Manipulation: Handing Objects to One Another" Aug. 2007, Robot and Human interactive Communication, 2007. RO-MAN 2007. The 16th IEEE International Symposium on.*
Satoru Shibata, Kanya Tanaka and Akira Shimizu, "Experimental Analysis of Handing Over", 1995, Robot and Human Communication, 1995. RO-MAN'95 Tokyo, Proceedings., 4th IEEE International Workshop on.*

* cited by examiner

*Primary Examiner* — Khoi Tran
*Assistant Examiner* — Ryan Rink
(74) *Attorney, Agent, or Firm* — Staas & Halsey LLP

(57) ABSTRACT

A robot one of transfers an article to an external subject and receives the article from the human subject and flexibly copes with changes in human intention. If a pushing force applied to robot hands is sensed, the robot hands grip and pull the article to inform the external subject that the robot hands are prepared to receive the article from the external subject, and transfers the article to the external subject or takes the article from the external subject according to whether the pushing force or a pulling force applied to the robot hands is sensed. If the pulling force applied to a robot hands is sensed, the robot pushes the article to inform the external subject that the robot hands are prepared to transfer the article to the external subject, and transfers the article to the external subject or takes the article from the external subject according to whether the pushing force or the pulling force applied to the robot hands is sensed.

8 Claims, 17 Drawing Sheets

ROBOT AND CONTROL METHOD

CROSS-REFERENCE TO RELATED APPLICATIONS

This application claims the benefit of Korean Patent Application No. 10-2010-0000938, filed on Jan. 6, 2010 in the Korean Intellectual Property Office, the disclosure of which is incorporated herein by reference.

BACKGROUND

1. Field

Example embodiments relate to a robot one of transferring and receiving an article from a human to flexibly cope with changes in human intention and a control method.

2. Description of the Related Art

Recently, manipulators, which are applied to an industrial robot field or an intelligent service robot field, cooperate with humans as well as engage in independent operation. Particularly, in case of cooperation between a robot and a human rather than operation between a robot and another robot, a control method flexibly coping with various conditions is required.

Particularly, if a robot gives an article to a human or receives an article from a human, only the position of the robot other than the cooperation between the robot and the human is focused and controlled, and thus flexible response to various conditions is insufficient. For example, when the human intends to transfer the article to a robot arm, it is possible that the human judges that the article is completely transferred to the robot arm even if the robot arm does not stably grip the article. The article may be dropped and damaged. Further, when the human intends to transfer the article to the robot arm and changes his/her intention during transfer of the article, the robot takes a designated action according to a designed algorithm, and then responds to the change in human intention, and may have a difficult time effectively coping with the change in the human intention.

SUMMARY

Therefore, it is an aspect of the example embodiments to provide a robot exchanging an article with a human and stably transferring the article to the human and receiving the article from the human and flexibly coping with changes in human intention during the transfer and receipt of the article and a control method.

The foregoing and/or other aspects are achieved by providing a control method of a robot, the robot having robot hands to grip an article and robot arms respectively connected to the robot hands, to one of transfer the article to an external subject and take the article from the external subject, including sensing, by a processor, magnitude and direction of external force applied to the robot hands, gripping the article with the robot hands upon judging that the external subject intends to transfer the article to the robot hands, pulling the article toward the robot hands by a first designated distance as a signal informing the external subject of stable gripping of the article, upon judging that the robot hands stably grip the article, and controlling, by the processor, a gripping force of the robot hands while determining the intention of the external subject based on magnitude and direction of the external force applied to the robot hand, after the pulling of the article by the robot hands toward the robot by the first designated distance.

Upon judging that the article is intended to be pulled from the robot hands based on the magnitude and direction of the external force applied to the robot hand after the pulling of the article by the robot hand toward the robot by the first designated distance, the gripping force of the robot hands may be reduced while pushing the article in a pulling direction of the article.

Upon judging that the external subject intends to transfer the article to the robot hands based on the magnitude and direction of the external force applied to the robot hands after the pulling of the article by the robot hands toward the robot by the first designated distance, the gripping force of the robot hands may be controlled and the robot hands stand by while gripping the article.

The foregoing and/or other aspects are achieved by providing a control method of a robot, the robot having robot hands to grip an article and robot arms respectively connected to the robot hands, to one of transfer the article to an external subject and take the article from the external subject, including sensing, by a processor, magnitude and direction of external force applied to the robot hands, pushing the article by the robot hands in a pulling direction of the article by a second designated distance, upon judging that the external subject intends to pull the article from the robot hands, and controlling, by the processor, a gripping force of the robot hands while determining the intention of the external subject based on magnitude and direction of the external force applied to the robot hands, after the pushing of the article by the robot hands in the pulling direction of the article by the second designated distance.

Upon judging that the external subject intends to pull article from the robot hands based on the magnitude and direction of the external force applied to the robot hands after the pushing of the article by the robot hands in the pulling direction of the article by the second designated distance, the gripping force of the robot hands may be reduced while pushing the article in the pulling direction of the article.

Upon judging that the article is intended to be pulled from the robot hand based on the magnitude and direction of the external force applied to the robot hand after the pushing of the article by the robot hand in the pulling direction of the article by the second designated distance, the gripping force of the robot hand may be controlled and the robot hand stands by while gripping the article.

The foregoing and/or other aspects are achieved by providing a robot including robot hands to grip an article, robot arms respectively connected to the robot hands to move the robot hands in desired directions, and a control unit to control the robot hands and the robot arms, wherein the control unit judges whether the article is one of intended to be transferred to the robot hands and to be pulled from the robot hands, the control unit grips the article upon judging that the article is intended to be transferred to the robot hands, and pulls the article toward the robot by a first designated distance as a signal informing of stably gripping the article, upon judging that the robot hands stably grip the article, and the control unit pushes the article in a pulling direction of the article by a second designated distance, upon judging that the article is intended to be pulled from the robot hands.

The control unit may control the robot to one of transfer the article to an external subject and take the article from the external subject by sensing magnitude and direction of the external force applied to the robot hands after one of the pulling of the article by the robot hands toward the robot by the first designated distance and pushing of the article by the robot hands in the pulling direction of the article by the second designated distance, and controlling a gripping force of the robot hands while determining the intention of the external subject based on the magnitude and direction of the external force applied to the robot hands.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
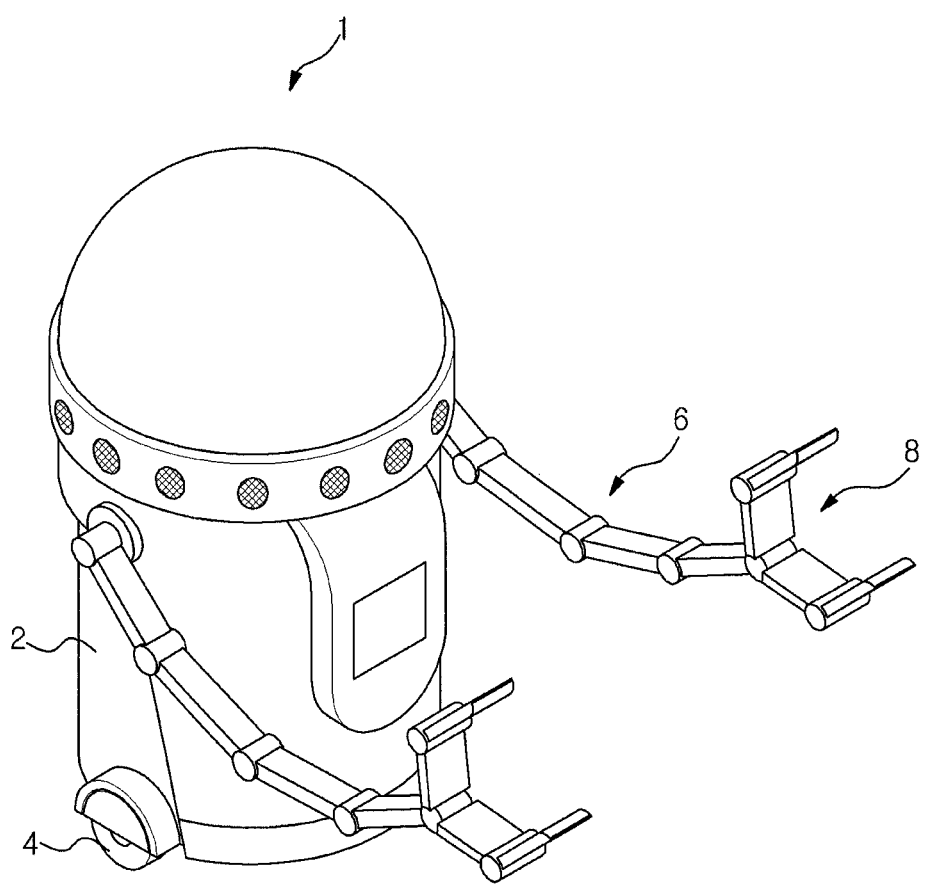
FIG. 1 is a perspective view of a robot in accordance with example embodiments

Reference will now be made in detail to the embodiments, examples of which are illustrated in the accompanying drawings, wherein like reference numerals refer to the like elements throughout.

FIG. 1 is a perspective view of a robot in accordance with example embodiments.

The robot 1 in accordance with example embodiments may include a body 2, driving wheels 4, robot arms 6, and robot hands 8. The robot 1 may move in a desired direction using the driving wheels 4, and grip an article using the robot arms 6 and the robot hands 8 including joints. The robot arms 6 and the robot hands 8 respectively may include the number of joints required according to design specifications, and the numbers of joints of the robot arms 6 and the robot hands 8 are not limited to those of FIG. 1. Hereinafter, with reference to FIG. 2, controls of the robot 1 will be described.

Figure 2:
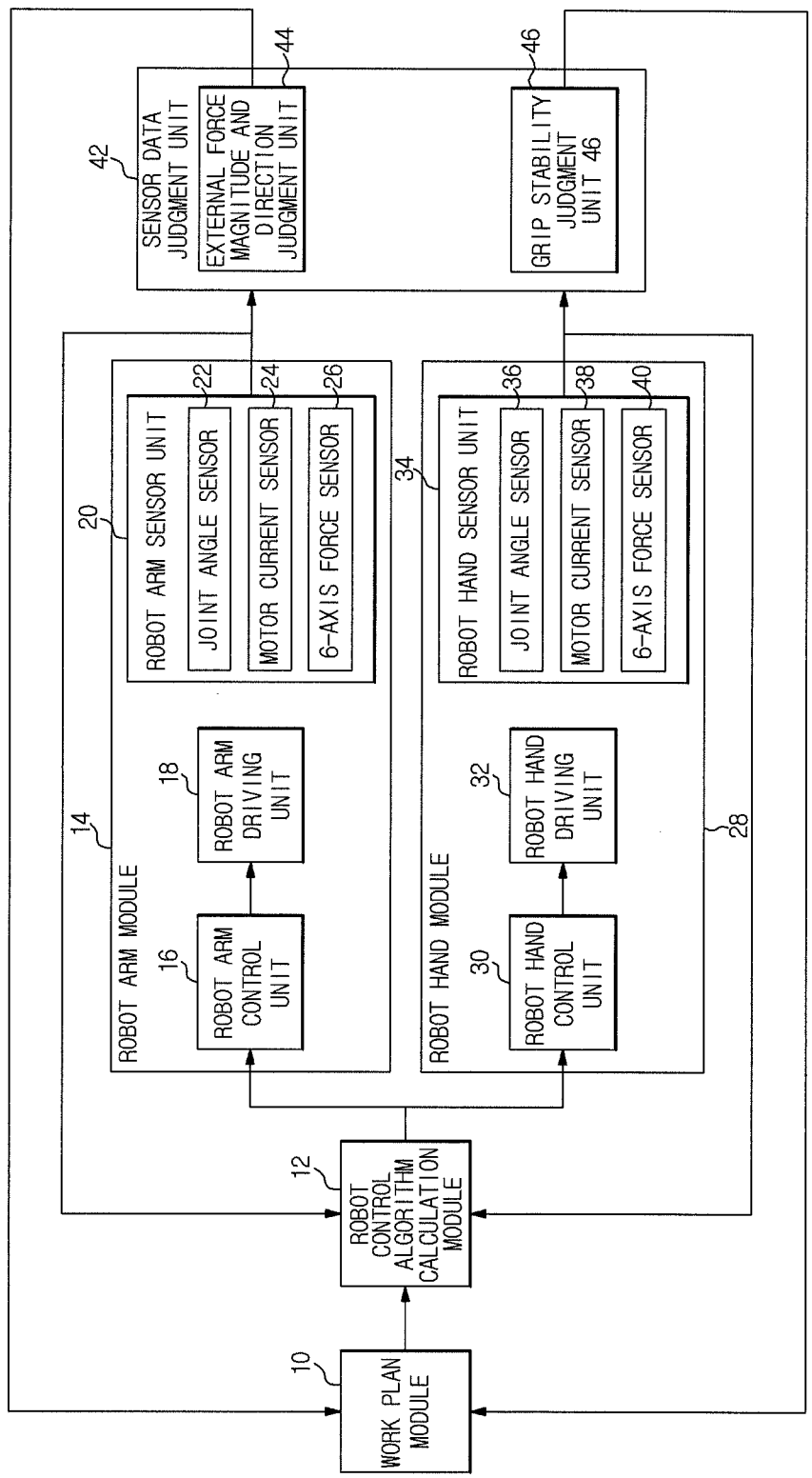
FIG. 2 is a block diagram schematically illustrating controls of the robot in accordance with example embodiments.

FIG. 2 is a block diagram schematically illustrating the controls of the robot in accordance with example embodiments.

The controls of the robot 1 may include a work plan module 10, a robot control algorithm calculation module 12, a robot arm module 14, a robot hand module 28, and a sensor data judgment unit 42. The robot arm module 14 may includes a robot arm control unit 16, a robot arm driving unit 18, and a robot arm sensor unit 20 including a joint angle sensor 22, a motor current sensor 24, and a 6-axis force sensor 26. The robot hand module 28 may include a robot hand control unit 30, a robot hand driving unit 32, and a robot hand sensor unit 34 including a joint angle sensor 36, a motor current sensor 38, and a 6-axis force sensor 40. The sensor data judgment unit 42 may include an external force magnitude and direction judgment unit 44 and a grip stability judgment unit 46.

The work plan module 10 may receive output signal data from the external force magnitude and direction judgment unit 44 and the grip stability judgment unit 46 of the sensor data judgment unit 42, and prepare a work plan of the robot 1. Particularly, the work plan module 10 may sense magnitude and direction of external force applied to the robot hand 8 of the robot 1, and control the robot arm 6 and the robot hand 8 such that the robot 1 may transfer an article to a human and receive the article from a human.

The robot control algorithm calculation module 12 may calculate an algorithm to control the robot arm 6 and the robot hand 8 based on the signal data received by the work plan module 10 and the signal data received by the robot arm sensor unit 20 and the robot hand sensor unit 34. The robot control algorithm calculation module 12 may transfer signal data of the calculated algorithm to the robot arm module 14 and the robot hand module 28, and control the robot arm 6 and the robot hand 8 to execute the work plan.

The robot arm module 14 may include the robot arm control unit 16, the robot arm driving unit 18, and the robot arm sensor unit 20. The robot arm control unit 16 may receive the algorithm signal data from the robot control algorithm calculation module 12, and control the robot arm drive unit 18. The robot arm 6 may include multiple joints and multiple motors to drive the respective joints, and a detailed description thereof will be given later. The robot arm control unit 16 may control the multiple motors of the robot arm 6, thus allowing the robot arm 6 to take an action satisfying the work plan. If it is judged that a human intends to transfer an article to the robot 1 or to take the article from the robot 1, the robot arm control unit 16 may control the robot arm 6 and the robot 1 may perform an operation of pulling or pushing the robot hand 8.

The robot arm sensor unit 20 may include the joint angle sensor 22, the motor current sensor 24, and the 6-axis force sensor 26. The joint angle sensor 22 may serve to measure angles of the respective joints of the robot arm 6. The measured angles of the respective joints may be used to control the operation of the robot arm 6 and the robot 1 may be operated according to the work plan. The motor current sensor 24 may serve to measure currents of the motors driving the respective joints. The currents of the motors may be measured when the motors are operated, and the operation of the robot arm 6 satisfying the work plan may be controlled based on the currents. The 6-axis force sensor 26 may sense magnitudes and directions of force applied to the respective joints of the robot arm 6. More specifically, the 6-axis force sensor 26 may sense magnitudes and directions of force applied in directions of the X-axis, the Y-axis, and the Z-axis and rotating directions in relation to the X-axis, the Y-axis, and the Z-axis. Sensing of force applied from the outside may become the basis of control of the operation satisfying the work plan.

Similarly to the robot arm module 14, the robot hand module 28 may include the robot hand control unit 30, the robot hand driving unit 32, and the robot hand sensor unit 34. The robot hand sensor unit 34 may include the joint angle sensor 36, the motor current sensor 38, and the 6-axis force sensor 40.

The robot hand control unit 30 may receive the algorithm signal data from the robot control algorithm calculation module 12, and control the robot hand driving unit 32, thereby causing the robot hand 8 to be operated according to the work plan. The robot hand 8 may include multiple joints and multiple motors to drive the respective joints, and a detailed description thereof will be given later. The robot hand control unit 30 may control the multiple motors of the robot hand 8, allowing the robot hand 8 to take an action satisfying the work plan. If it is judged or determined that a human intends to transfer an article to the robot 1 or to take the article from the robot 1, the robot hand control unit 30 may control the respective joints of the robot hand 8 to grip the article or reduce gripping force of the robot hand 8. Particularly, it may be judged whether the human intends to transfer an article to the robot 1 or to receive the article from the robot 1 using magnitudes and directions of force sensed by the 6-axis force sensor 26 of the robot arm sensor unit 20.

The robot hand sensor unit 34 may include the joint angle sensor 36, the motor current sensor 38, and the 6-axis force sensor 40. As in the robot arm sensor unit 20, joint angles, motor currents, and force data measured through the robot hand sensor unit 34 may be used as basic data to operate the robot 1 to satisfy the work plan.

The sensor data judgment unit 42 may include the external force magnitude and direction judgment unit 44 and the grip stability judgment unit 46. The external force magnitude and direction judgment unit 44 may receive signal data from the 6-axis force sensor 26 of the robot arm sensor unit 20 and the 6-axis force sensor 40 of the robot hand sensor unit 34, and sense magnitudes and directions of external force applied to the robot arm 6 and the robot hand 8. Particularly, the sensor data judgment unit 42 may judge whether a human intends to transfer an article to the robot 1 or intends to receive the article form the robot 1 using magnitudes and directions of external force applied to the robot hand 8.

The grip stability judgment unit 46 may receive signal data from the joint angle sensor 36, the motor current sensor 38, and the 6-axis force sensor 40 of the robot hand sensor unit 34, and may judge whether the robot hand 8 stably grips the article to prevent the article from being dropped. A method of judging whether the robot hand 8 stably grips the article without dropping when the robot hand 8 grips the article will be described, as follows. First, when torque applied to the robot hand 8 is more than a designated reference value, it may be judged that the robot hand 8 grips the article at a proper force. This reference value may be set when the robot 1 is designed. Thereafter, when velocities of the respective joints of the robot hand 8 are close to zero, it may be judged that the gripping of the article by the robot hand 8 reaches a stable state. When the velocities of the respective joints of the robot hand 8 reach a designated velocity according to design specifications of the robot 1, it may be judged that the gripping of the article by the robot hand 8 enters the stable state. Thereafter, when a distance between tips of the joints of the robot hand 8 are more than a designated distance, it may be judged that the robot hand 8 is not empty but rather grips the article. Although the designated distance is varied according to design specifications, the designated distance may be set to about 20 mm. The above three conditions may be combined and applied to judgment of grip stability, but one or two conditions among the three conditions may be applied to judgment of grip stability according to design specifications.

Figure 3:
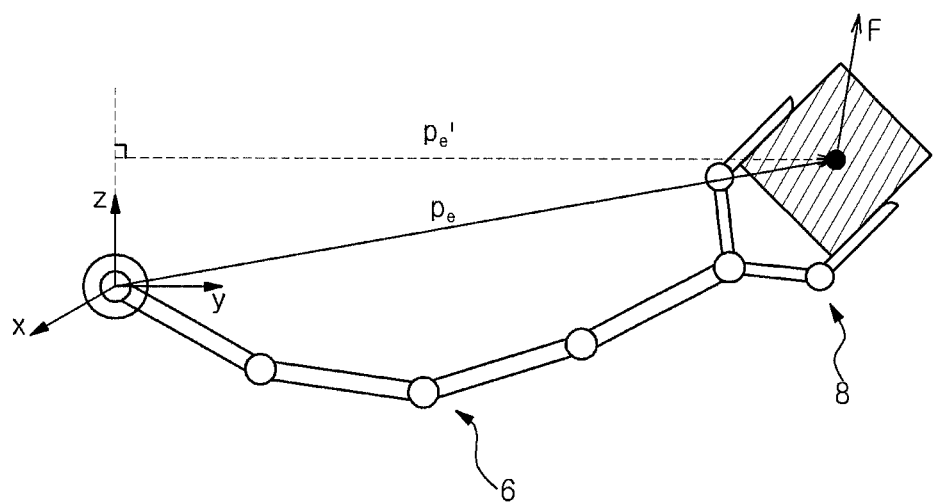
FIG. 3 is a view illustrating judgment of whether a force applied to a robot hand of the robot in accordance with example embodiments is a pushing force or pulling force.

FIG. 3 is a view illustrating judgment as to whether force applied to the robot hand of the robot in accordance with example embodiments is a pushing force or pulling force.

In FIG. 3, a vector F on an article gripped by the robot hand 8 may represent external force of a pull by a human. A vector from a base, which is the center of a shoulder joint, connected to the body 2 of the robot 1, among the respective joints of the robot arm 6, to the center of the article may be defined to be $p_e$. Further, a vector perpendicular to the Z-axis of the base and the center of the article may be defined to be $p_e'$. The vector $p_e'$ may be defined and the criteria for judgment of whether applied external force is pushing force or pulling force may be based on a directional component from the robot hand 8 to the Z-axis of the base of the robot 1 other than a directional component from the robot hand 8 to the base of the robot 1. The respective vectors may have coordinates, as follows.

$$p_e = [p_{ex}, p_{ey}, p_{ez}] \quad p_e' = [p_{ex}, p_{ey}, 0]$$

Hereinafter, is a method of judging a direction of external force applied to the robot hand 8 of the robot 1 will be described.

$$\frac{F}{|F|} \cdot \frac{p_e^l}{|p_e^l|} > \delta \text{ Pulling force from robot hand}$$

$$\frac{F}{|F|} \cdot \frac{p_e^l}{|p_e^l|} > -\delta \text{ Pushing force toward robot}$$

Here, $\delta$ is a minute value, which may be determined when the robot 1 is designed. The direction of external force may be determined based on magnitude and direction of a value obtained by inner product of a unit vector of the external force and a unit vector of a vector from the base to the center of an article, through the above equations. Hereinafter, with reference to FIG. 4A, operation of the robot 1, if external force is applied to the robot 1 by a human, will be described in detail.

FIGS. 4A to 4F are views illustrating operation of the robot if it is sensed that the force applied to the robot hand of the robot in accordance with example embodiments is a pushing force.

Figure 4A:
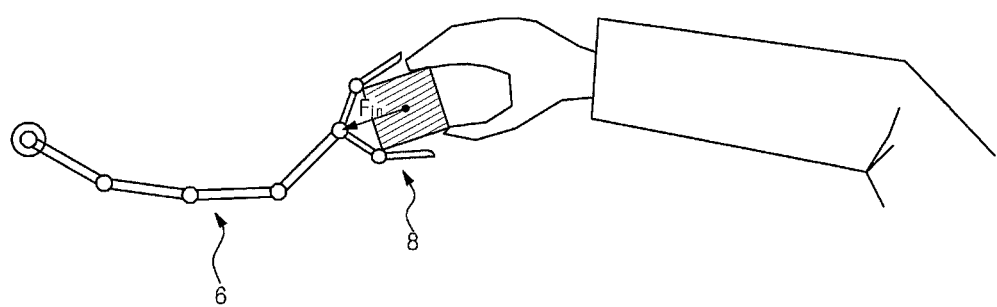
FIGS. 4A to 4F are views illustrating operation of the robot if it is sensed that the force applied to the robot hand of the robot in accordance with example embodiments is a pushing force.

FIG. 4A illustrates that a human may grip an article and transfer the article to the empty robot hand 8. When the human may grip the article and push the article to the robot hand 8, the 6-axis force sensor 26 of the robot arm 6 may judge that the article is transferred to the robot hand 8. When a pushing force more than a designated magnitude toward the robot 1 is sensed, as shown in FIG. 3, it may be judged that a subject, such as the human, intends to transfer the article to the robot hand 8.

Figure 4B:
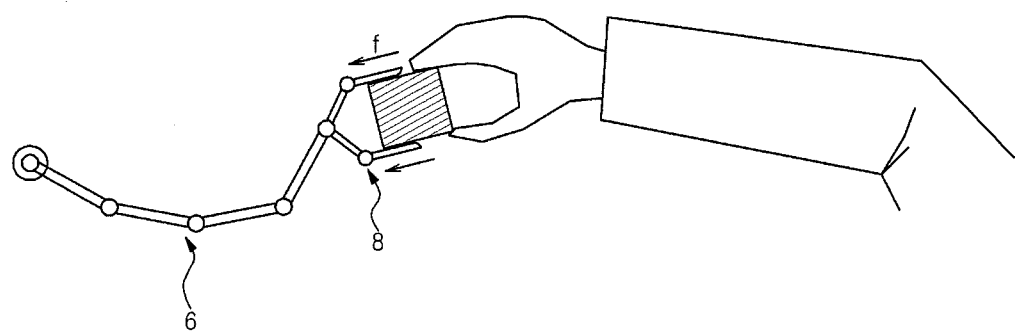

The work plan module 10 may judge that the article is intended to be transferred to the robot hand 8 by means of external force sensed by the 6-axis force sensor 26 of the robot arm sensor unit 20, and send signal data to the robot hand control unit 30 through the robot control algorithm calculation module 12 to allow the robot hand 8 to grip the article. FIG. 4B illustrates that it may be judged that the article is intended to be transferred to the robot hand 8 and the robot hand 8 grips the article. When it is judged that the robot hand 8 stably grips the article to not drop the article, the robot hand 8 may slightly pull the article toward the robot 1 by a first designated distance. The first designated distance may be set to a particular value when the robot 1 is designed. Since the pulling of the article toward the robot 1 by the first designated distance is a signal indicating that the robot 1 stably grips the article, the first designated distance may be set to a value of about several cm which is not excessively large.

The reason why the article may be slightly pulled toward the robot 1 by the first designated distance when it is judged that the robot hand 8 stably grips the article is as follows. The pulling of the article toward the robot 1 by the first designated distance serves to inform the subject, such as the human, of stable gripping of the article, and then to allow the subject to release the article. When the article is transferred from the human to the robot hand 8, if the human releases the article as soon as the robot hand 8 begins a gripping action, the robot hand 8 may drop the article before stable gripping of the article, and thus the article may be damaged. Therefore, as the signal informing the human of stable gripping of the article, the robot hand 8 may slightly pulls the article toward the robot 1. Of course, in addition to the pulling of the article toward the robot 1, a regular alarm sound may be provided or a light may be displayed on a display unit of the robot 1. However, in a controlling method of the robot 1 in accordance with example embodiments, the pulling of the article toward the robot 1 by the first designated distance is described to propose simpler transfer and receipt of an article between the robot 1 and the human to intuitively judge human intention to transfer an article by only using a pulling force or a pushing force exerted on the article from the robot 1 and the human.

Figure 4C:
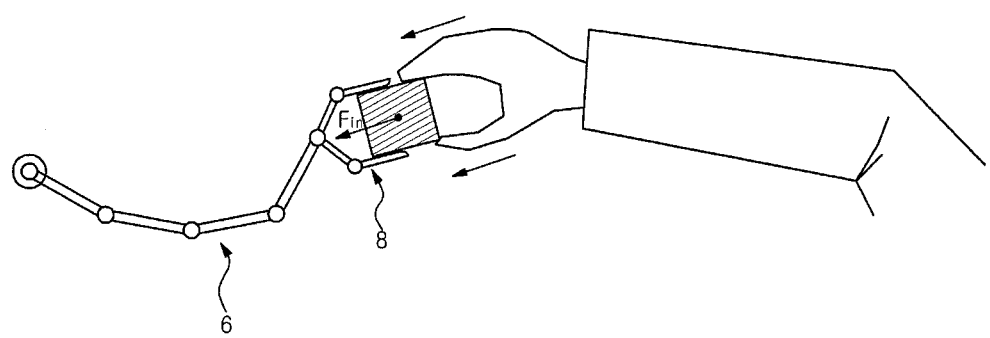
Figure 4D:
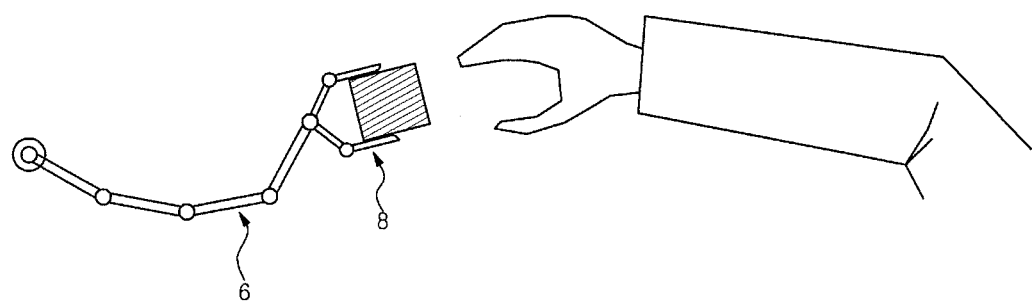

FIG. 4C illustrates that the human may push the article toward the robot hand 8 to transfer the article to the robot hand 8 according to the initial intention. If it is judged that the robot hand 8 stably grips the article then the robot hand 8 may pull the article toward the robot 1 by the first designated distance. After the pulling of the article toward the robot 1 by the first designated distance, when a pushing force toward the robot hand 8 is sensed, the robot hand 8 may stand by while gripping the article, as shown in FIG. 4D. Further, although not shown, after the pulling of the article toward the robot 1 by the first designated distance, when external force due to the human is not sensed, the robot hand 8 may stand by while gripping the article. It may be assumed that it is judged that transfer of the article from the human to the robot 1 has been completed and force may not be applied to the robot hand 8 anymore.

Figure 4E:
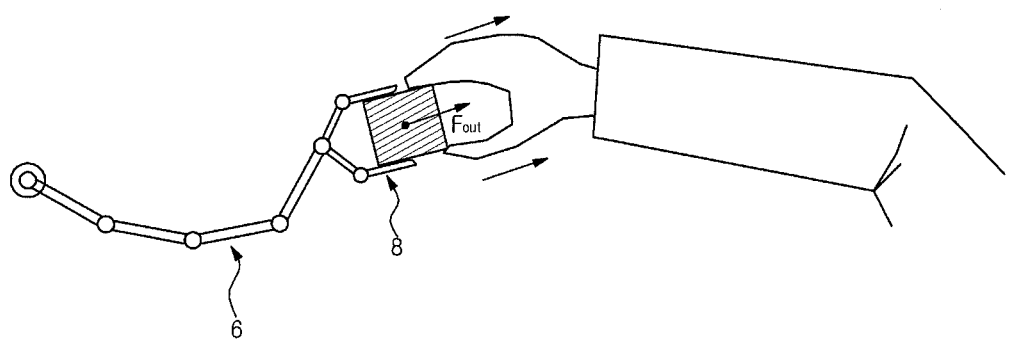
Figure 4F:
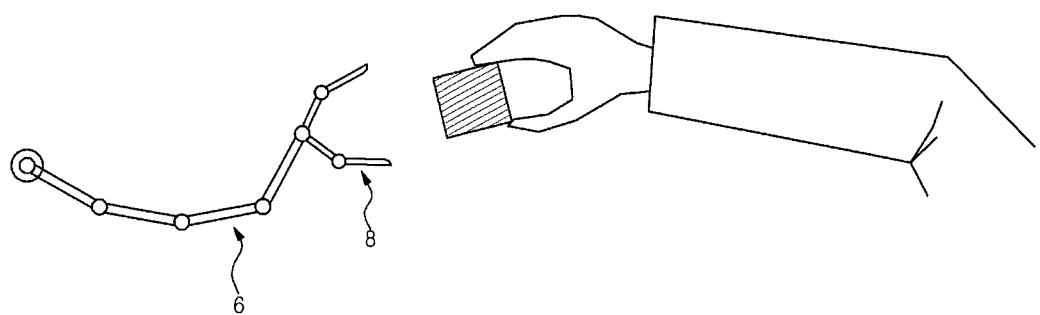

FIG. 4E illustrates that the human may pull the article from the robot hand 8 to take the article from the robot hand 8 opposite to an initial intention if it is judged that the robot hand 8 stably grips the article. The robot hand 8 may pull the article toward the robot 1 by the first designated distance, as shown in FIG. 4B. The robot hand 8 may sense pulling force from the robot hand 8, and understand that the human does not intend to transfer the article to the robot hand 8 but rather intends to take the article from the robot hand 8. Then, as shown in FIG. 4F, the robot hand 8 may push the article toward the human in the direction of the pulling force while reducing its gripping force, thereby allowing the human to take the article.

If it is judged that the human intended to transfer the article i to the robot hand 8 by sensing pushing force toward the robot hand 8 in the above-described method, the robot hand 8 may first grip the article, and then slightly pull the article as a signal informing the human of stable gripping of the article. Thereafter, the robot hand 8 may stand by while gripping the article or reduce its gripping force according to whether the human pushes or pulls the article. Thereby, the robot 1 may flexibly cope with human intention even if the human initially intends to transfer the article to the robot hand 8 and then changes his/her initial intention.

FIGS. 5A to 5F are views illustrating operation of the robot if it is sensed that the force applied to the robot hand of the robot in accordance with example embodiments is pulling force.

Figure 5A:
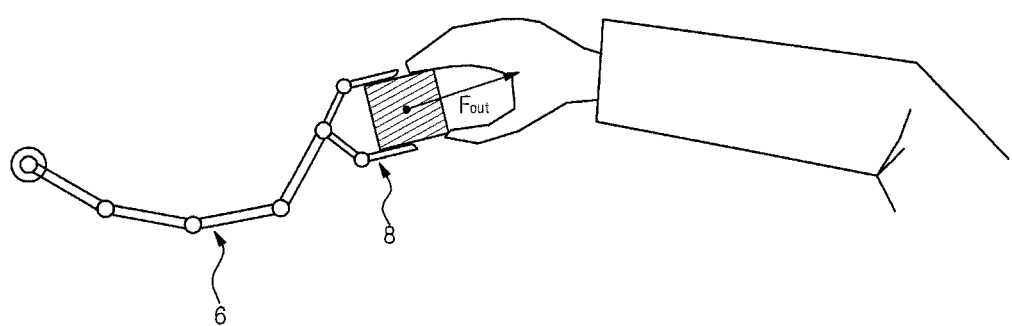
FIGS. 5A to 5F are views illustrating operation of the robot if it is sensed that the force applied to the robot hand of the robot in accordance with example embodiments is a pulling force.
Figure 5B:
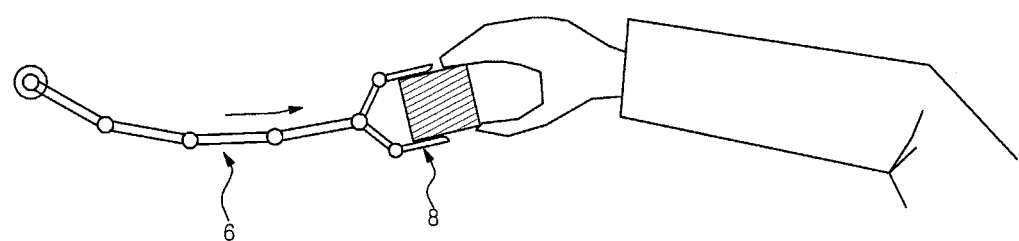

FIG. 5A illustrates that a human may pull an article from the robot hand 8 when the robot hand 8 stably grips the article. When pulling force applied to the robot hand 8 is sensed, the robot hand 8 may understand that the human intends to take the article from the robot hand 8, and push out the article by a second designated distance in the direction of the pulling force, as shown in FIG. 5B. In the same manner as the first designated distance, the second designated distance may be set to a particular value of about several cm which is not excessively large when the robot 1 is designed.

Figure 5C:
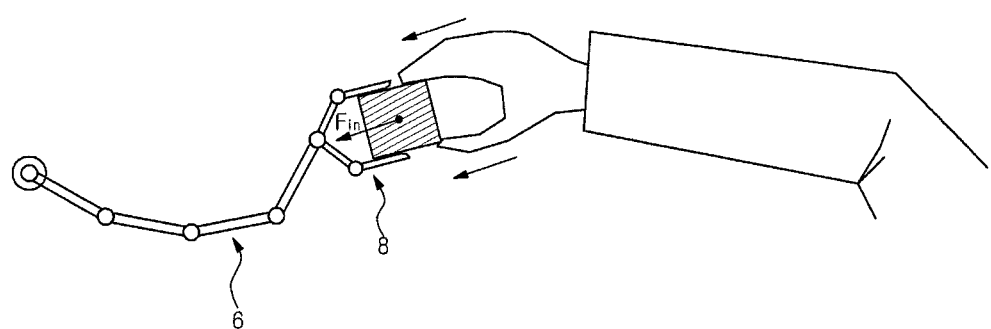
Figure 5D:
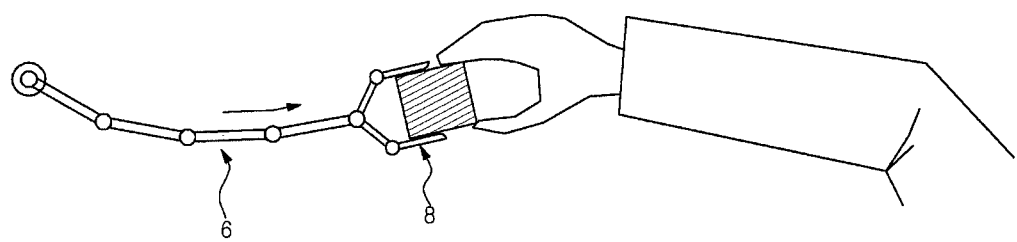

FIG. 5C illustrates that the human may push the article toward the robot hand 8 to transfer the article to the robot hand 8, opposite to the initial intention. Then, the robot 1 may understand that the human intends to transfer the article to the robot hand 8, and the robot hand 8 may stand by while maintaining its gripping force. Further, after the pushing of the article toward the human by the second designated distance, when external force due to the human is not sensed, the robot hand 8 may stand by while gripping the article. It may be assumed that the human intention to take the article from the robot 1 is changed and force may not be applied to the robot hand 8 anymore.

Figure 5E:
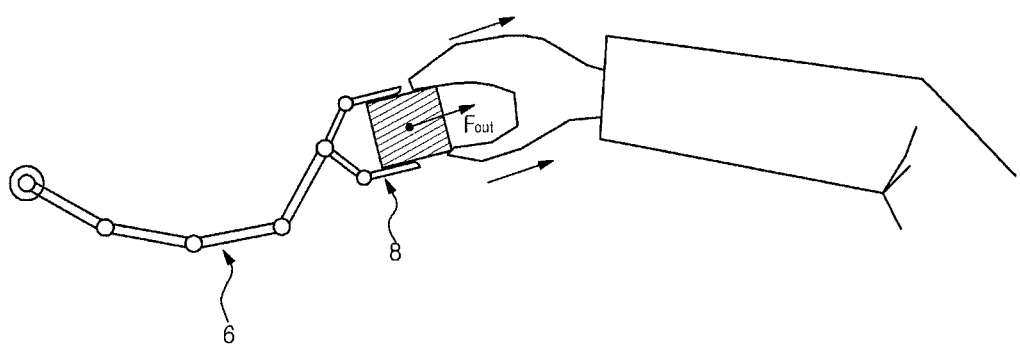
Figure 5F:
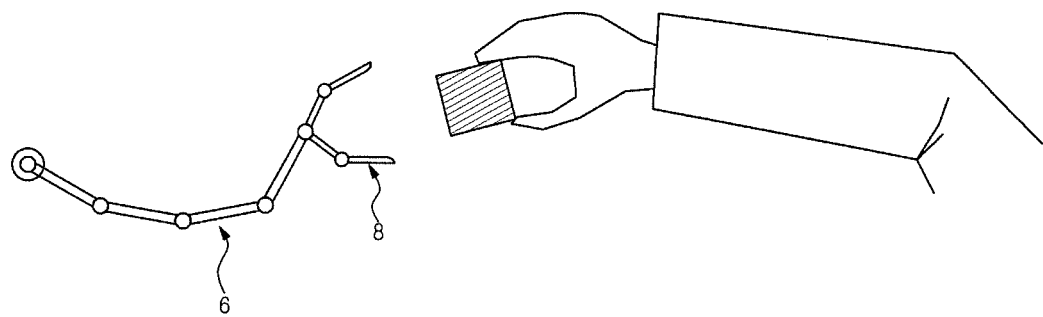

FIG. 5E illustrates that the human may intend to take the article from the robot hand 8 according to the initial intention, and pull the article from the robot hand 8 as shown in FIG. 5F. When the pulling force applied to the robot hand 8 is sensed, the robot 1 may understand that the human intends to take the article again from the robot hand 8, and reduce the gripping force of the robot hand 8 to allow the human to take the article from the robot hand 8. Through the above method, the robot 1 may more actively transfer the article to the human and take the article from the human, and particularly, may flexibly cope with changes in human intention during the transfer and receipt of the article. Hereinafter, the entire operation of the robot 1 will be described in detail with reference to FIGS. 6 and 7.

Figure 6:
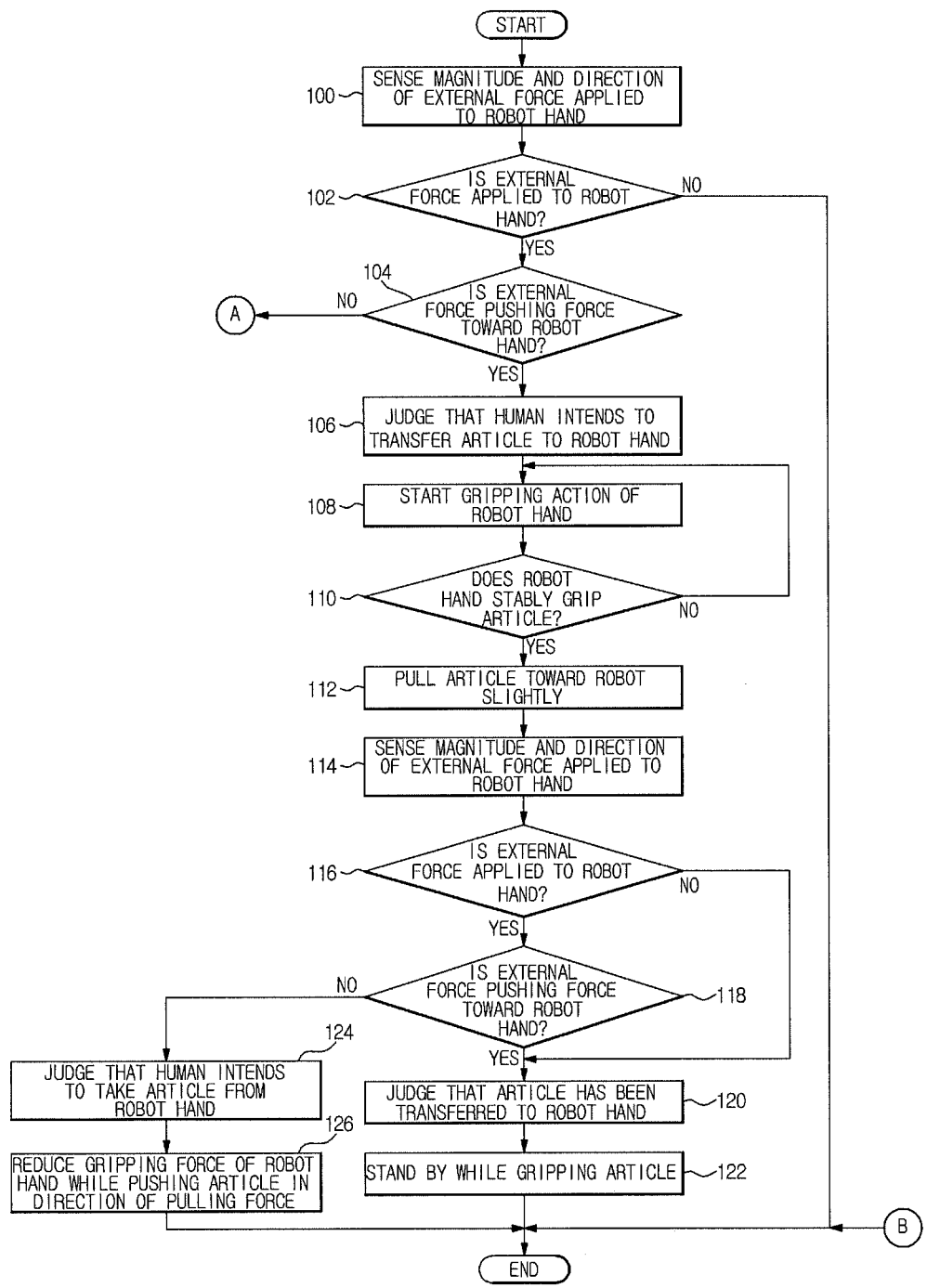
FIGS. 6 and 7 are flow charts illustrating a control method of a robot in accordance with example embodiments.
Figure 7:
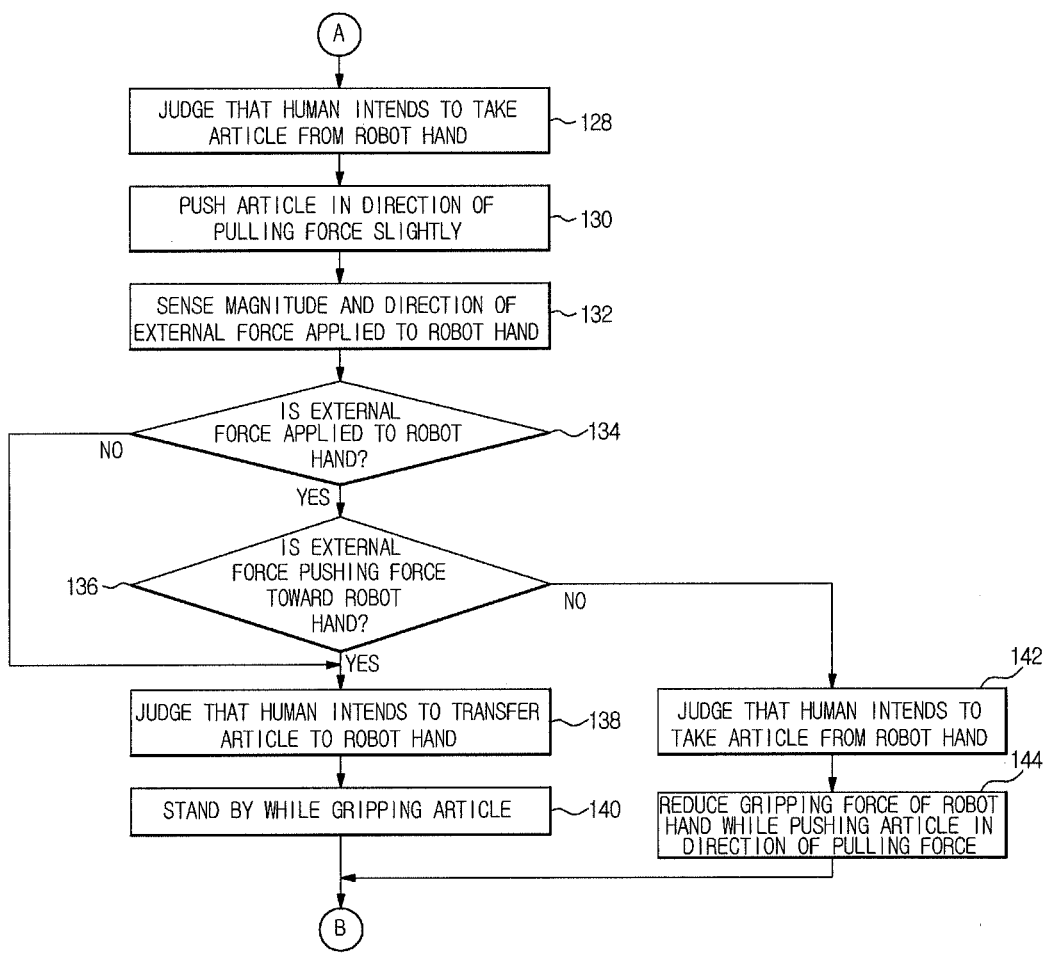

FIGS. 6 and 7 are flow charts illustrating a control method of a robot in accordance with example embodiments.

FIG. 6 is a flow chart of operation of the robot 1 in accordance with example embodiments, if an article is transferred to the robot 1. The robot 1 may sense magnitude and direction of external force applied to the robot hand 8, thereby judging whether a human intends to transfer the article to the robot hand 8 or intends to take the article from the robot hand 8 (100). The robot 1 may first judge whether external force is applied to the robot hand 8 (102). If external force is not applied to the robot hand 8, the human does not intend to transfer the article to the robot hand 8 or intend to take the article from the robot hand 8, and thus the robot 1 may take no action. If external force is applied to the robot hand 8, it may be judged whether the external force is pushing force toward the robot hand 8 (104). If it is judged that the external force is not the pushing force toward the robot hand 8 but is pulling force from the robot hand 8, it may be judged that the human intends to take the article from the robot hand 8, and thus a detailed description thereof will be given later with reference to FIG. 7.

If it is judged that the external force is the pushing force toward the robot hand 8, the robot 1 may judge that the human intends to transfer the article to the robot hand 8 (106). If it is judged that the human intends to transfer the article to the robot hand 8, the robot 1 may control the robot hand 8 to start gripping action of the robot hand 8 (108). Thereafter, the robot 1 may judge whether the robot hand 8 stably grips the article without dropping the article (110). If it is judged that the robot hand 8 does not stably grip the article, the robot 1 may continuously control the robot hand 8 to stably grip the article. On the other hand, if it is judged that the robot hand 8 stably grips the article, the robot 1 may pull the article toward the robot 1 by the first designated distance (112). The pulling of the article toward the robot 1 may serve as a signal indicating stable gripping of the article to allow the human to release the article.

After the pulling of the article toward the robot 1 by the first designated distance, the robot 1 may re-sense magnitude and direction of external force applied to the robot hand 8 (114). The re-sensing of magnitude and direction of external force may be used to judge whether the human wants to maintain his/her initial intention to transfer the article to the robot hand 8 or to change his/her initial intention to take the article from the robot hand 8. Although example embodiments illustrate that the external force is sensed step-by-step, the 6-axis force sensor 26 installed on the robot arm 6 may continuously sense magnitude and direction of external force applied to the robot hand 8 to control the robot hand 8 according to human intention.

Human intention may be judged by sensing magnitude and direction of the external force after the pulling of the article toward the robot 1 by the first designated distance. The robot 1 may first judge whether external force is applied to the robot hand 8 (116). If external force is not applied to the robot hand 8, the robot 1 may judge that the article has been transferred to the robot hand 8 (120), and the robot hand 8 may stand by while gripping the article (122). When the human intends to transfer the article to the robot hand 8 of the robot 1, if the robot hand 8 stably grips the article and pushes the article toward the robot 1 by the first designated distance and the robot 1 judges that the article is properly transferred to the robot hand 8 and takes no action, the robot 1 may stand by while gripping the article. Further, if pushing force toward the robot hand 8 is sensed, the robot 1 may judge that the human intends to transfer the article to the robot hand 8 in the same manner as the initial intention, and thus the robot hand 8 may stand by while gripping the article.

If external force is applied to the robot hand 8, the robot 1 may judge whether the external force is pushing force toward the robot hand 8 (118). If it is judged that the external force is pulling force, it is judged that the article has been transferred to the robot hand 8 (120), and the robot hand 8 may stand by while gripping the article (122). The reason why it may be judged that the article has been transferred to the robot hand 8 (120) is that it is assumed that the human may put the article into the robot hand 8 while pushing the article in the same direction according to the initial intention. The judgment that the article has been transferred to the robot hand 8 may denote judgment that the human intends to transfer the article to the robot hand 8 according to the initial intention.

If it is judged that the external force is not pushing force toward the robot hand 8 but rather is pulling force from the robot hand 8 (118), the robot 1 may judge that the human intends to take the article again from the robot hand 8 (124), and may reduce its gripping force while pushing the article in the direction of the pulling force (126). It may denote a case that the human changes his/her initial intention to transfer the article to the robot hand 8 and thus takes the article from the robot hand 8.

FIG. 7 is a flow chart of operation of the robot 1, if it is judged that the external force applied to the robot hand 8 is pulling force from the robot hand 8 in operation 104 of FIG. 6.

If it is judged that the external force applied to the robot hand 8 is pulling force from the robot hand 8, the robot 1 may judge that the human intends to take the article from the robot hand 8 (128). The robot 1 may slightly push the article by the second designated distance in the direction of the pulling force (130). Thereafter, the robot 1 may re-sense magnitude and direction of the external force applied to the robot hand 8 (132).

The robot 1 may first judge whether external force is applied to the robot hand 8 (134). If external force is not applied to the robot hand 8, the robot 1 may judge that the human intends to transfer the article to the robot hand 8 (138), and the robot hand 8 may stand by while gripping the article (140). The reason robot 1 may judge that the human intends to transfer the article to the robot hand 8 (138) and the robot hand 8 stands by while gripping the article (140) may be as follows. If the human pulls the article with intention to take the article from the robot hand 8, the robot 1 may slightly push the robot hand 8 by the second designated distance in the direction of the pulling force. If external force is not applied to the robot hand 8 after the pushing of the robot hand 8 by the second designated distance, the robot 1 may judge that intention to take the article from the robot hand 8 has dissipated, and thus the robot hand 8 may stand by while gripping the article. If the human intends to take the article from the robot hand 8, the pulling force of the article may be continuously maintained.

If external force is applied to the robot hand 8, the robot 1 may judge whether the external force is pushing force toward the robot hand 8 (136). If it is judged that the external force is pushing force toward the robot hand 8, it may be judged that the human changes his/her initial intention and intends to transfer the article to the robot hand 8 (138), and the robot hand 8 may stand by while gripping the article (140).

If it is judged that the external force is not pushing force toward the robot hand 8 but rather is pulling force from the robot hand 8 (136), the robot 1 may judge that the human intends to take the article from the robot hand 8 (142), and may reduce gripping force while pushing the article in the direction of the pulling force (144). If the robot 1 reduces the gripping force to transfer the article to the human, the robot 1 may judge the human intention, and continuously maintain the pulling force after the pushing of the robot hand 8 in the direction of the pulling force by the second designated distance.

According to the example embodiments, the robot 1 may actively and stably transfer the article to the human and take the article from the human. Particularly, if the human transfers the article to the robot, the robot 1 may inform the human of the stable gripping of the article by the robot hand 8 through slight pulling of the article to allow the human to release the article from the robot hand 8 without dropping. Further, if the intention of the human is changed, the robot 1 may flexibly cope with the change in the intention.

As is apparent from the above description, a robot in accordance with example embodiments may stably perform transfer of an article to a human and receive the article from the human, and flexibly cope with changes in human intention during the transfer and receipt of the article.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. A control method of a robot, the robot having hands to grip an article and robot arms respectively connected to the robot hands to one of transfer the article to an external subject and take the article from the external subject, comprising:

sensing, by a processor, magnitude and direction of external force applied to the robot hands;

gripping the article with the robot hands upon judging that the external subject intends to transfer the article to the robot hands;

pulling the article toward the robot by the robot hands by a first designated distance as a signal informing the external subject of stable gripping the article, upon judging that the robot hands stably grip the article; and controlling a gripping force of the robot hands while determining the intention of the external subject based on magnitude and direction of the external force applied to the robot hands, after the pulling of the article by the robot hands toward the robot by the first designated distance.

2. The method according to claim 1, wherein, upon judging that the article is intended to be pulled from the robot hands based on the magnitude and direction of the external force applied to the robot hands after the pulling of the article by the robot hands toward the robot by the first designated distance, the gripping force of the robot hands is reduced while pushing the article in the direction of the pulling external force applied to the robot hands.

3. The method according to claim 1, wherein, upon judging that the external subject intends to transfer the article to the robot hands based on the magnitude and direction of the external force applied to the robot hands after the pulling of the article by the robot hands toward the robot by the first designated distance, the gripping force of the robot hand is controlled and the robot hands stand by while gripping the article.

4. A control method of a robot, the robot having robot hands to grip an article and robot arms respectively connected to the robot hands, to one of transfer the article to an external subject and take the article from the external subject, comprising:

sensing, by a processor, magnitude and direction of an external force applied to the robot hands;

pushing the article by the robot hands in the direction of the pulling external force applied to the robot hands by a second designated distance upon judging that the external subject intends to pull the article from the robot hand; and controlling a gripping force of the robot hands while determining the intention of the external subject based on magnitude and direction of the external force applied to the robot hands after the pushing of the article by the robot hands in the direction of the pulling external force applied to the robot hands by the second designated distance.

5. The method according to claim 4, wherein upon judging that the external subject intends to pull the article from the robot hands based on the magnitude and direction of the external force applied to the robot hands after the pushing of the article by the robot hands in the direction of the pulling external force applied to the robot hands by the second designated distance, the gripping force of the robot hands is reduced while pushing the article in the direction of the external force applied to the robot hands.

6. The method according to claim 4, wherein upon judging that the external subject intends to pull the article from the robot hands based on the magnitude and direction of the external force applied to the robot hands after the pushing of the article by the robot hands in the direction of the external force applied to the robot hands by the second designated distance, the gripping force of the robot hands is controlled and the robot hands stand by while gripping the article.

7. A robot, comprising:

robot hands to grip an article;

robot arms respectively connected to the robot hands to move the robot hands in desired directions; and a control unit to control the robot hands and the robot arms, wherein:

the control unit judges whether the article is one of intended to be transferred to the robot hand and to be pulled from the robot hands;

the control unit grips the article upon judging that the article is intended to be transferred to the robot hand, and pulls the article toward the robot by a first designated distance as a signal informing of stably gripping the article upon judging that the robot hands stably grip the article; and the control unit pushes the article in the direction of an external force applied to the robot hands by an external subject by a second designated distance, upon judging that the article is intended to be pulled from the robot hand.

8. The robot according to claim 7, wherein:

the control unit controls the robot to one of transfer an article to an external subject and take the article from the external subject by sensing a magnitude and direction of the external force applied to the robot hands after one of the pulling of the article by the robot hands toward the robot by the first designated distance and pushing of the article by the robot hands in the direction of the external force by the second designated distance, and controlling a gripping force of the robot hands while determining the intention of the external subject based on the magnitude and direction of the external force applied to the robot hands.

* * * * *

UNITED STATES PATENT AND TRADEMARK OFFICE
CERTIFICATE OF CORRECTION

PATENT NO.         : 8,538,583 B2
APPLICATION NO.    : 12/985623
DATED              : September 17, 2013
INVENTOR(S)        : Ji Young Kim et al.

Page 1 of 1

It is certified that error appears in the above-identified patent and that said Letters Patent is hereby corrected as shown below:

In the Claims

In Column 12, Line 31, In Claim 8, delete "an" and insert -- the --, therefor.
In Column 12, Line 32, In Claim 8, delete "an" and insert -- the --, therefor.

Signed and Sealed this
Eighteenth Day of February, 2014

Michelle K. Lee
*Deputy Director of the United States Patent and Trademark Office*